United States Patent [19]
Costello et al.

[11] 4,134,136
[45] Jan. 9, 1979

[54] PAPER CARRIER FOR FACSIMILE MACHINE

[75] Inventors: Matthew J. Costello, Bethel; Thomas K. Saunders, New Milford; Albert M. DeLuca, New Fairfield, all of Conn.

[73] Assignee: Burroughs Corporation, Detroit, Mich.

[21] Appl. No.: 789,073

[22] Filed: Apr. 20, 1977

[51] Int. Cl.$^2$ .......................... H04N 1/08; B41F 21/04
[52] U.S. Cl. .................................... 358/291; 101/415.1
[58] Field of Search ......................................... 358/291

[56] References Cited

U.S. PATENT DOCUMENTS

| | | | |
|---|---|---|---|
| 3,618,123 | 11/1971 | Buddendeck | 101/415.1 |
| 4,056,829 | 11/1977 | Ikeda | 358/256 |

*Primary Examiner*—Howard W. Britton
*Attorney, Agent, or Firm*—Kevin R. Peterson; Robert A. Green; Edward J. Feeney, Jr.

[57] ABSTRACT

The disclosure is of a facsimile machine having a carrier for a sheet of paper, the carrier comprising a cylinder having a longitudinal band secured thereto by springs so that the band is normally pulled downwardly onto the surface of the cylinder. A sheet of paper is rolled about the cylinder, with one end of the sheet of paper held securely between the band and the cylinder.

The cylinder is mounted on a machine frame which includes a cover plate which is pivotally mounted over the paper-holding cylinder. The cover is provided with a finger which serves no purpose when the cover is closed, but, when the cover is opened, the finger engages a bracket which itself engages the longitudinal band to lift it from the surface of the cylinder to permit a sheet of paper to be inserted or removed.

5 Claims, 7 Drawing Figures

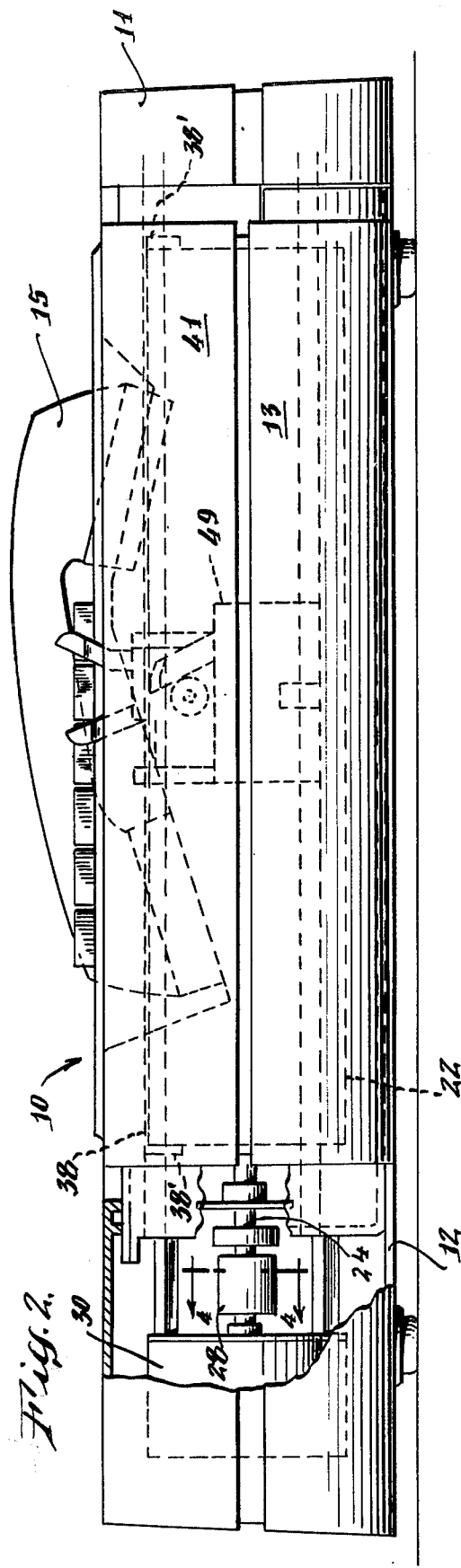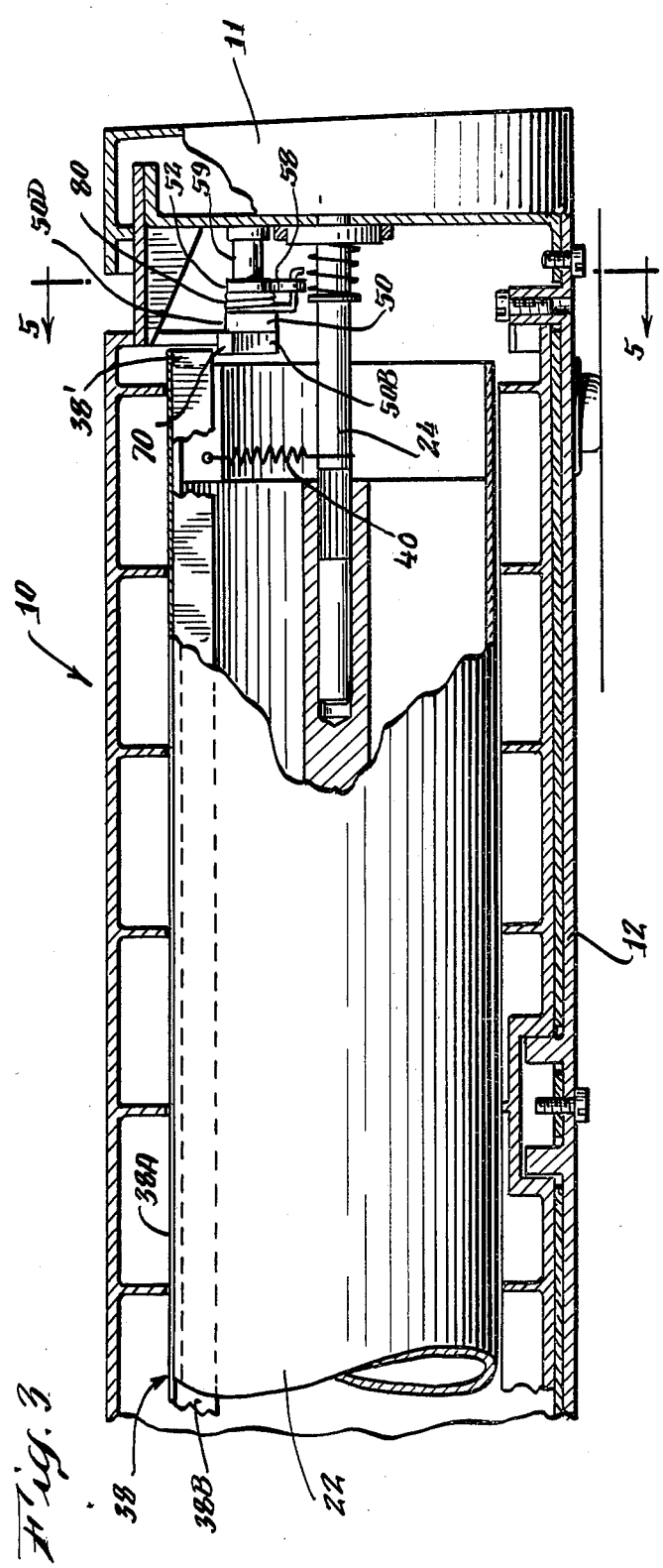

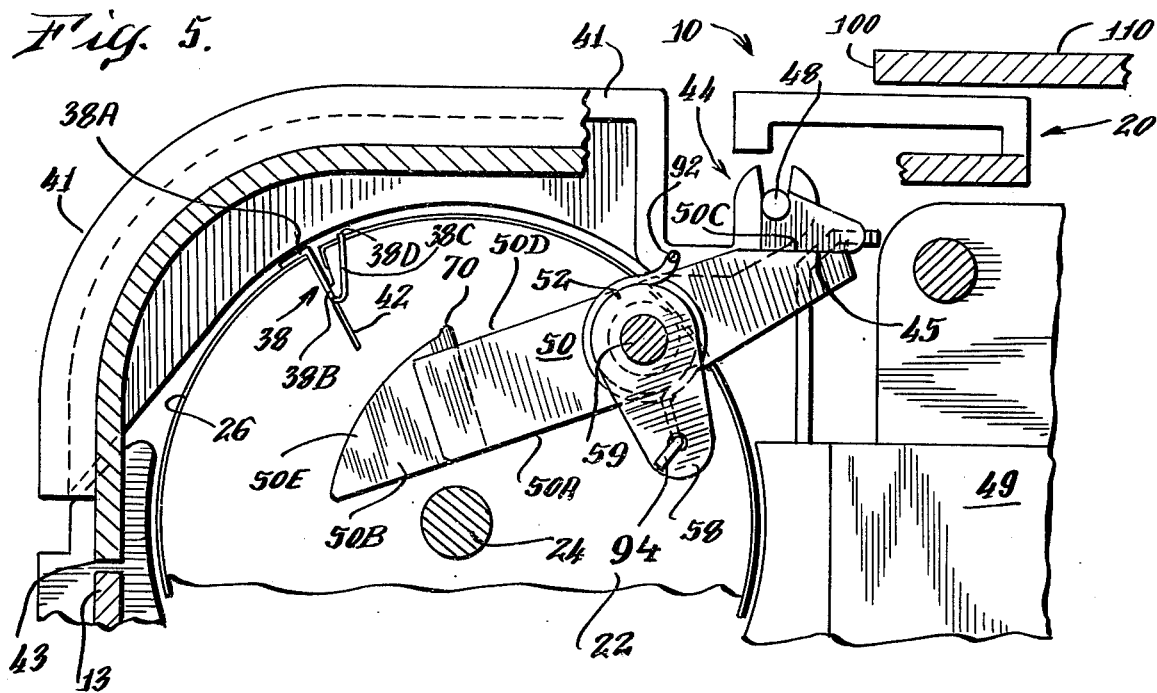
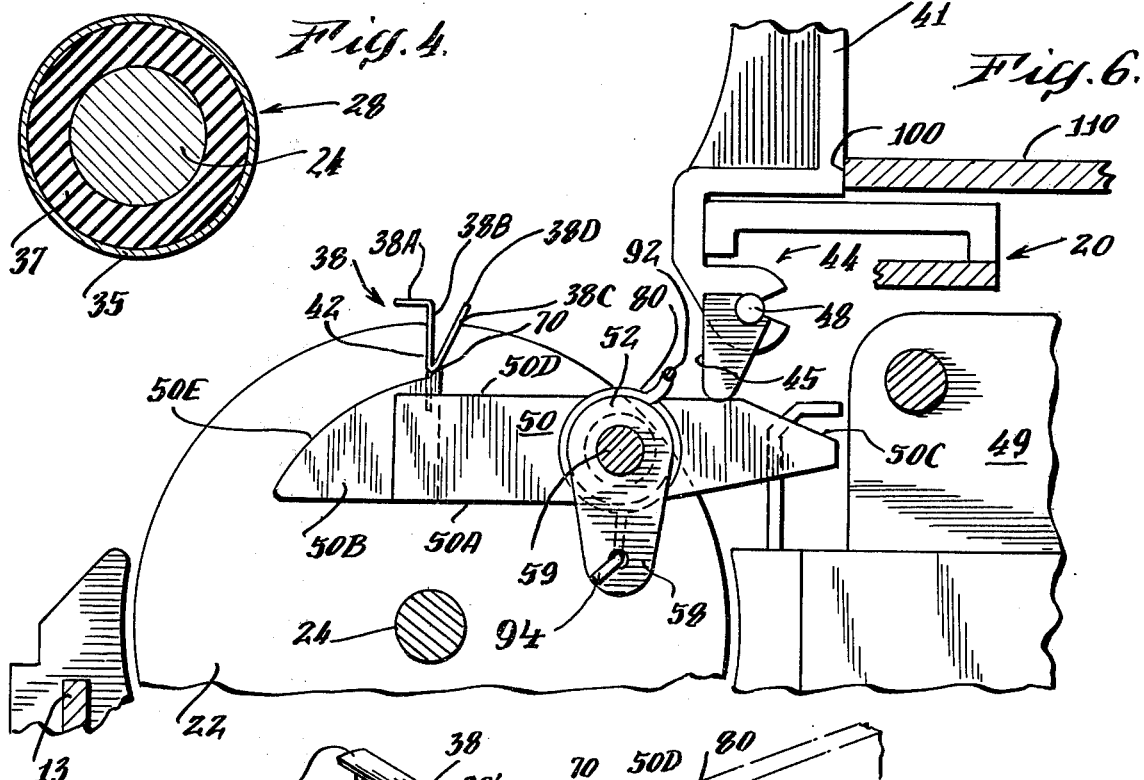
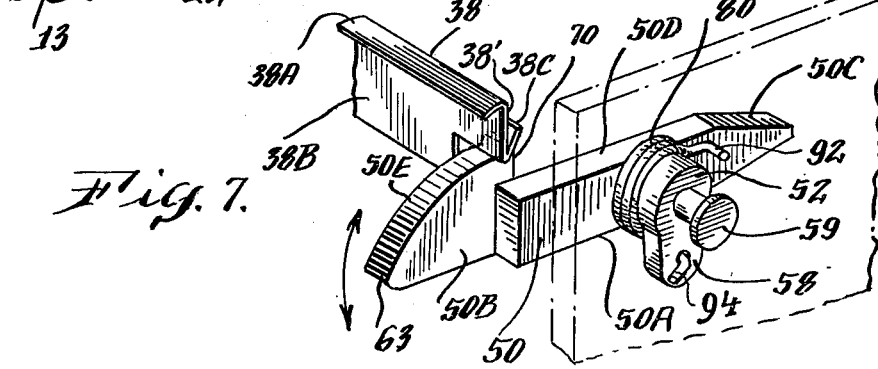

PAPER CARRIER FOR FACSIMILE MACHINE

BACKGROUND OF THE INVENTION

Apparatus is known for holding a sheet of paper on a rotatable cylinder and permitting the paper to be secured to or removed from the cylinder. However, such known apparatus is not as simple in construction and operation as that described herein.

DESCRIPTION OF THE DRAWINGS

FIG. 2 is a front elevational view, partly in section, of the apparatus of FIG. 1;

FIG. 3 is a front elevational view, partly in section, of another portion of the apparatus of the invention;

FIG. 4 is a sectional view of a portion of the apparatus of FIG. 1;

FIG. 5 is a sectional view, along the lines 5—5 in FIG. 3, showing apparatus embodying the invention at one stage in its operation;

FIG. 6 shows the apparatus of FIG. 5 at another stage in its operation; and

FIG. 7 is a perspective view of a portion of the apparatus of FIG. 5.

DESCRIPTION OF THE PREFERRED EMBODIMENTS

Figure 1:
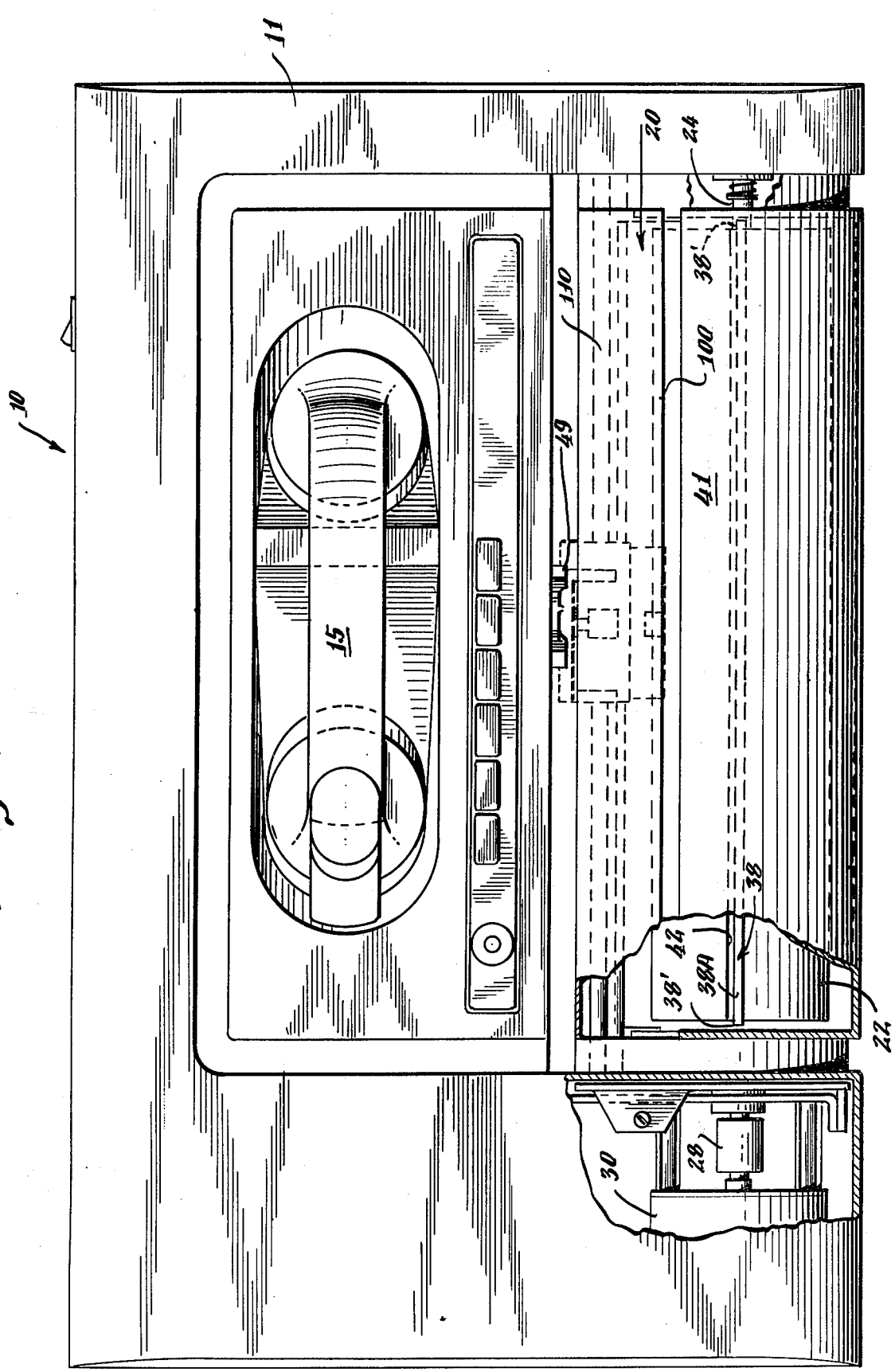
FIG. 1 is a plan view of a facsimile machine embodying the invention.

The present invention is useful with many types of apparatus; however, it is particularly suited for use with a facsimile machine 10, one form of which is illustrated in FIGS. 1–3. The facsimile machine 10 includes a housing or casing 11 which contains the usual electronic circuitry, a rotatable cylinder 22 which carries a document sheet 26, apparatus 49 for reading the document or writing electrically on the document sheet, a supply of toner, and a telephone handset 15 which transmits and receives electrical signals.

The housing 20 for the machine 10 includes a base plate 12 which carries various walls or other structural members which provide a support function. At the front of the machine, the base 12 rotatably supports a cylindrical tube 22 which is secured to a shaft 24 by means of webs 25 and is adapted to carry a blank or printed sheet of paper 26 to be processed in a manner well known in the art.

One end of shaft 24 is coupled through a flexible coupling 28 to a motor 30, by means of which the cylinder can be rotated in operation of the apparatus. The flexible coupling 28 (FIG. 4) comprises a metal cylinder 35 having a lining 37 of a flexible material in which the shaft 24 is seated. This flexible coupling arrangement serves to smooth out variations in motion of the motor and permits the shaft to be rotated smoothly.

The cylinder 22 includes means for gripping and releasing the edge of the sheet of paper 26 to be read or printed. This means includes an L-shaped metal band or strip 38 which comprises a first generally horizontal portion 38A which is seated on the cylinder and extends longitudinally along the length of the cylinder, and a second generally vertical portion 38B which extends downwardly in a longitudinal slot 42 in the cylinder. The L-shaped band is drawn downwardly onto the surface of the cylinder by means of springs 40 which are secured between the shaft 24 and the vertical L-shaped portion 38B of the band (FIG. 3). The end 38' of the band 38 extends a short distance beyond the ends of the cylinder for a purpose to be described.

Referring to FIGS. 5–7, the housing 20 for the machine 10 includes a cover plate or door 41 which has a lower front edge 43 which seats on the upper edge of the front wall 13 of the base plate 12, and it has an upper rear edge portion 44 which carries a shaft 48 secured to the housing of the machine and by means of which the cover plate can be rotated to expose or cover the cylinder 22. At one or both ends of its rear edge, the door carries a projecting finger 45.

The machine 10 includes apparatus (FIGS. 5–7) for holding the door in the open position and raising the band so that a sheet of paper can be inserted or removed. This apparatus includes an actuating lever 50 which is elongated and generally rectangular in shape and has its axis of rotation disposed somewhat rearwardly of its center. At this axis of rotation, the lever is provided with a hub 52 which is rotatably mounted on a pin 59 which is suitably secured to a wall of the housing. The hub 52 has a depending portion 58. In one embodiment of the invention, the lever 50 includes a main body portion 50A and an offset portion 50B which is positioned to engage end 38' of the band 38 on cylinder 22. If space permits, the two portions 50A and 50B can be aligned to form a unitary structure.

Considering the lever 50 in more detail, portion 50A includes an upper edge which is made up of a ramp-like rear portion 50C which rises to a generally flat portion 50D. The offset portion 50B includes a generally curved operating surface or edge 50E which curves upwardly from the front end 63 of the lever and terminates in a stop 70.

A spring 80 is wound about the hub 52, one end 92 engaging the housing 20 and the other end 94 engaging the portion 58 of the hub beneath the axis of rotation thereof. The spring 80 urges the lever 50 counter-clockwise, as seen in FIG. 5, and lever 50 assumes the position seen in FIG. 5 when door 41 is closed.

In operation of the apparatus shown in FIGS. 5–7, when and as the door 41 is opened, the finger 45, bearing on the rear portion 50C of the upper edge of the lever 50, causes the lever to rotate clockwise about the pivot pin 59. When the door is fully opened, it bears against the front edge 100 of the cover portion 110 of the housing directly behind it, and, at this time, the finger 45 rests on surface 50D of lever 50, and it has pivoted beyond the vertical to such a point that it holds lever 50 locked in position with the aid of the spring 80. This causes the cover 41 to stay open without the operator holding it open.

Rotation of the cylinder 22 then drives the edge 38' of band 38 along the surface 50E of the lever 50 to raise it from the surface of the cylinder. The plate bears against the stop 70 while paper is inserted or removed.

When this operation is completed, the door 41 is forced closed by being rotated counter-clockwise to release the finger 45 from arm 50. The spring 80 pulls the lever 50 down to permit the cylinder 22 to rotate freely, and the plate 38 is drawn down by its springs to hold the sheet of paper securely on the cylinder.

It is noted that the apparatus shown in FIGS. 5–7 has the advantage that, when the door 41 is opened, it is held opened, and the operator's hands are free to manipulate the paper. In addition, the apparatus is so designed that the band 38 is raised and paper can be removed or inserted when the band is at 12 o'clock, as seen in FIG. 6. This places the band favorably close to the front of the machine and facilitates the manipulation of the paper by the operator.

What is claimed is:

1. In document handling apparatus,
   a rotatable cylinder for supporting a sheet of paper,
   a band extending across the surface of said cylinder and securing one end of said sheet of paper in place on said cylinder,
   spring means pulling said band into engagement with said surface of said cylinder,
   a bracket mounted adjacent to said cylinder and adapted to occupy a first position and a second position, such that when said bracket is in said first position, said band engages said bracket as said cylinder is rotated and is pulled away from the surface of said cylinder to permit a sheet of paper to be inserted therebetween or removed therefrom, and when said second means is in said second position, said band does not engage said bracket,
   a door extending the length of said cylinder and covering said cylinder, said door being pivotably mounted on said apparatus and including a portion which engages said bracket, whereby said bracket holds said door open when it is in said first position and it holds said door closed when it is in said second position, and
   a spring mounted on said bracket and oriented (1) to urge said bracket to hold said door open when said bracket is in said first position or (2) to urge said bracket to hold said door closed when said bracket is in said second position.

2. The apparatus defined in claim 1 wherein said bracket is generally elongated and includes an upper operating surface having a rearward portion positioned to be engaged by said portion of said door, said upper operating surface having a forward portion positioned to be engaged by said band.

3. A document handling machine comprising
   a housing,
   a rotatable cylinder in said housing for supporting a sheet of paper,
   a pivotable door in said housing covering said cylinder,
   a band extending across the surface of said cylinder and securing one end of said sheet of paper in place on said cylinder,
   spring means pulling said band into engagement with said surface of said cylinder,
   a bracket pivotably mounted on said housing adjacent to said cylinder and adapted to occupy a first position and a second position, such that when said bracket is in said first position, said band can engage said bracket and be pulled away from the surface of said cylinder to permit a sheet of paper to be inserted therebetween or removed therefrom, and when said second means is in said second position, said band cannot engage said bracket,
   said door having a projecting portion which is positioned so that, when the door is pivoted to the open position, said projecting portion moves said bracket to said first position, and when said door is closed, said projecting portion of said door cannot engage said bracket and said bracket is in said second position, and
   a spring mounted on said bracket and oriented (1) to urge said bracket to hold said door open when said bracket is in said first position and (2) to urge said bracket to hold said door closed when said bracket is in said second position.

4. The apparatus defined in claim 3 wherein said band is generally L-shaped and has a first portion which is seated on the surface of said cylinder, and a second portion which projects into said cylinder through a longitudinal slot in said cylinder.

5. The apparatus defined in claim 4 and including a plurality of springs which pull said band into engagement with the surface of said cylinder.

* * * * *